United States Patent [19]

Saltzman et al.

[11] 4,088,618

[45] May 9, 1978

[54] ROSIN-MODIFIED EPOXY RESINS

[75] Inventors: Ronald Saltzman, Morris Plains; William J. Ferrara, Hackensack; Olgierd Wasilewski, Edison, all of N.J.

[73] Assignee: Sun Chemical Corporation, New York, N.Y.

[21] Appl. No.: 628,835

[22] Filed: Nov. 4, 1975

[51] Int. Cl.[2] .......................... C08L 93/04; C08F 2/46

[52] U.S. Cl. ................................ 260/24; 205/159.12; 204/159.15; 204/159.19; 428/458; 428/482; 428/497

[58] Field of Search ..................... 260/24; 204/159.12, 204/159.23

[56] References Cited

U.S. PATENT DOCUMENTS

| | | | |
|---|---|---|---|
| 3,264,235 | 8/1966 | Hustinx | 260/24 X |
| 3,285,870 | 11/1966 | Vandenberg | 260/24 |
| 3,298,981 | 1/1967 | Fry et al. | 260/24 X |
| 3,355,401 | 11/1967 | Tanner | 260/24 X |
| 3,878,145 | 4/1975 | Güldenpfennig | 260/24 X |
| 3,983,088 | 9/1976 | Pozdneev et al. | 260/24 |

*Primary Examiner*—Howard E. Schain
*Assistant Examiner*—W. C. Danison, Jr.
*Attorney, Agent, or Firm*—Cynthia Berlow

[57] ABSTRACT

The properties of photocurable printing inks and coating compositions comprising an ethylenically unsaturated monomeric compound, a photoinitiator, and optionally a colorant are improved by the addition of certain rosin-modified epoxy resins.

3 Claims, No Drawings

ROSIN-MODIFIED EPOXY RESINS

This invention relates to epoxy resins. More particularly it relates to rosin-modified epoxy resins that are useful in photopolymerizable printing inks and coating compositions.

The use of photopolymerizable ethylenically unsaturated monomeric materials in coating compositions, adhesives, printing inks, and the like is known. It is also known that such monomeric materials are converted into polymers by the action of radiation and that they will polmerize at an improved rate when exposed to radiation in the presence of a photoinitiator and/or a photosensitizer. Most ethylenically unsaturated monomeric materials, however, are relatively poor carriers for pigment and are difficult to utilize as printing inks and coating compositions, particularly when the ink or coating is to be applied to a metal substrate.

It has now been found that the properties of printing inks and coating compositions that comprise an ethylenically unsaturated monomeric compund, a photoinitiator, and optionally a colorant can be greatly enhanced by the addition thereto of about 5 to 25, and preferably about 10 to 15, per cent based on the weight of the total composition of a rosin-modified epoxy resin, to be defined in detail hereinafter. Compositions containing the resins of this invention are particularly useful as lithographic ink vehicles, since they have, for example, good pigment wetting and printing properties. For example, a metal decorating ink containing the modified epoxy resin has good wet lithographing properties, good printability, and pigment wetting and rheological properties that are superior to inks without the resin. When exposed to ultraviolet radiation, the cure speed was increased; there was good adhesion to a variety of substrates; and the film properties, e.g., scratch- and mar-resistance, were good. After a thermal post-cure the desirable film properties were retained and resistance to pasteurization was good.

The starting resins are alcohols which contain terminal epoxy and glycidyl groups as well as intermediate esterifiable hydroxyl groups and which are produced from dihydric phenols by reaction with epichlorhydrin in alkaline solution or by the reaction of dihydric phenols with diepoxides to produce polyether derivatives of the dihydric phenol having terminal aliphatic epoxy groups.

The dihydric phenol may be mononuclear, such as for example resorcinol, or polynuclear, such as for example bisphenol (p,p'-dihydroxydiphenyldimethyl methane) and other dihydroxydiaryldialkyl methanes, 1,5-dihydroxy naphthalene, etc.

The glycidyl ethers or epoxy resins may be produced from the dihydric phenols by heating with epichlorohydrin in the presence of caustic alkali, using more than one mol of epichlorhydrin per mol of the dihydric phenol and up to about 2 mols of epichlorhydrin per mol of dihydric phenol and using an amount of caustic alkali somewhat in excess of that equivalent to the epichlorhydrin. The heating is contained to convert the product into a mixture of glycidyl ethers or epoxy ethers. The principal product may be represented by the following formula:

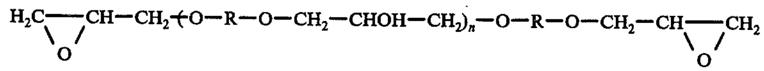

where R is the divalent hydrocarbon radical of the dihydric phenol and $n$ is 1, 2, 3, etc.

The length of the chain and the extent of polymerization can be varied by changing the molecular proportions of epichlorohydrin and dihydric phenol. By decreasing the molecular ratio of epichlorhydrin to dihydric phenol from 2 epichlorhydrin to 1 dihydric phenol toward a ratio of 1 epichlorhydrin to 1 dihydric phenol, the molecular weight and the softening point of the epoxy resin or glycidyl ether is increased.

In general these epoxy ethers or glycidyl ethers contain terminal epoxide groups and have alternating intermediate aliphatic hydroxyl-containing and aromatic nuclei linked through ether oxygen and with terminal epoxide-containing aliphatic groups.

The polyhydric epoxy resins also include the reaction product of dihydric phenols with diepoxides such as diglycidyl ether, butadiene diepoxide, and the diepoxides and polyepoxides resulting from the reaction of polyhydric alcohol such as glycerol, etc., with epichlorhydrin to produce polychlorhydrin ethers of the polyhydric alcohol and by dihydrogenation of the polychlorhydrin ethers, e.g., with sodium aluminate, such epoxy resins also containing alternating aromatic and aliphatic nuclei or groups united through ether oxygen.

Suitable rosins for reaction with the epoxy resin include, but are not limited to, tall oil rosins, hydrogenated and dehydrogenated wood rosins, polymerized wood rosin, gum rosin, and the like, and their mixtures.

The reaction takes place generally, but not necessarily, in the presence of a catalyst, such as for example a tertiary amine, e.g., N,N-benzyldimethylamine, triethylamine, tripropylamine, triamylamine, amyldimethylamine, and amyldiethylamine; a quaternary ammonium hydroxide, e.g., benzyl trimethyl ammonium hydroxide; potassium hydroxide; stannous octoate; ethylmethylimidazole; and the like; and mixtures thereof.

From about 0.85 to about 1 equivalent of rosin acid is reacted with about 1 equivalent of the epoxy resin.

The reaction is generally carried out at a temperature of about 140° to 220° C., and preferably it is within the range of about 150° to 185° C.

The rosin-modified epoxy resins of this invention are particularly useful in inks and coatings vehicles in the presence of a photoiniator along with ethylenically unsaturated monomeric materials such as for example the esters disclosed in U.S. pat. Nos. 3,551,235; 3,551,246; 3,551,311, 3,558,387 and 3,759,809, for exampile di- and polyacrylates, di- and polymethacrylates, di- and polyitaconates, di- and polycinnamates, and di- and polysorbates of, e.g., alkylene glycols, alkoxylene glycols, alicyclic glycols, and higher polyols such as ethylene glycol, triethylene glycol, tetraethylene glycol, tetramethylene glycol, butanediols, pentanediols, hexanediols, octadiols, trimethylolethane, trimethylolpropane, pentaerythritol, dipentaerythritol, sorbitol, and the like, and modifications and mixtures thereof. It is also suitable to use monoesters, preferably of high molecular weight, as reactive diluents. These include, for example, hydroxyethyl acrylate, hydroxyethyl methacrylate, and hydroxyhexyl acrylate. The amounts may range from about 10 to 90 parts by weight of the modified epoxy resin to about 90 to 10 parts by weight of the monomeric material, and preferably the amount ranges from about 25 to 60.75 to 40.

Examples of suitable photoinitiators include, but are not limited to, the following: acyloins such as benzoin; acyloin derivatives such as benzoin methyl ether, benzoin ethyl ether, desyl bromide, desyl chloride, desyl amine, and the like; ketones such as benzophenone, acetophenone, ethyl methyl ketone, cyclopentanone, benzil, caprone, benzoyl cyclobutanone, dioctyl acetone, and the like; substituted ketones such as Michler's ketone, tribromoacetophenone, and tricloroacetophenone; polynuclear quinones such as benzoquinone andd anthraquinone; substituted polynuclear quinones such as 1-chloroanthraquinone, 2-methylanthraquinone, and 2,3-diphenylanthraquinone; halogenated aliphatic, alicyclic, and aromatic hydrocarbons in which the halogen may be chlorine, bromine, fluorine, or iodine, such as polyhalogenated polyphenyl resins; chlorinated rubbers, such as the Parlons (Hercules Powder Company); copolymers of vinyl chloride and vinyl isobutyl ether, such as Vinoflex MP-400 (BASF Colors and Chemicals, Inc.); chlorinated aliphatic waxes, such as Chlorowax 70 (Diamond Alkali, Inc.); perchloropentacyclodecane, such as Dechlorane+ (Hooker Chemical Co.); chlorinated paraffins, such as Chlorofin 40 (Hooker Chemical Co.) and Unichloro-70B (Neville Chemical Co.); mono- and polychlorobenzenes; mono- and polybromoxylenes; 2,4-dimethylbenzene sulfonyl chloride; 1-bromo-3-(m-phenoxyphenoxy benzene); 2-bromoethyl methyl ether; chlorendic anhydride; chloromethylnaphthyl chloride; chloromethyl naphthalene; bromomethyl phenanthrene; diiodomethyl anthracene; hexachlorocyclopentadiene; hexachlorobenzene; and the like; and mixtures thereof.

The ratio of the amount of the photoinitiator to the amount of total of the monomeric material and the modified epoxy resin is about 1:99 to about 90:10 and preferably from about 2.98 to about 50:50, depending upon the photoinitiator selected and the required speed of cure.

When used as a vehicle for inks, the composition may be pigmented with any of a variety of conventional organic or inorganic pigments, e.g., molybdate orange, titanium white, chrome yellow, phthalocyanine blue, and carbon black, as well as colored with dyes in a conventional amount. For example, the vehicle may be used in an amount ranging from about 20 to 99.9 per cent and the amount of colorant may range from about 0.1 to 80 percent of the weight of the total composition.

Commonly known modifiers may be incorporated into the formulations using these resins, including plasticizers; wetting agents for the colorant; leveling agents, such as lanolin, paraffin waxes, and natural waxes; slip agents, such as low molecular weight polyethylenes, microcycrystalline petroleum waxes, and silicon oils; and the like. Such modifiers are generally used in amounts ranging up to about 3 percent by weight, preferably about 1 percent, based on the total weight of the formulation. Other ingredients conventionally used in inks and coatings can be utilized to modify adhesion, toughness, and other key properties.

The formulations may be prepared in any convenient manner, such as for example in a three-roll mill, a sand mill, a ball mill, a colloid mill, or the like, in accordance with known dispersion techniques.

The rate at which the photopolymerizable composition will dry varies with the nature of the substrate, the specific ingredients in the composition, the concentration of the photoinitiator, the thickness of the applied film, the nature and intensity of the radiation source and its distance from the material, the presence or absence of oxygen, and the temperature of the surrounding atmosphere. Irradiation may be accomplished by any one or a combination of a variety of methods; for example, the composition may be exposed to actinic light from any source and of any type as long as it furnishes an effective amount of ultraviolet radiation, since the compositions activatable by actinic light generally exhibit their maximum sensitivity in the range of about 1800A to 4000A, and referably about 2000A to 3800A; electron beams, gamma radiation emitters; and the like; and combinations of these. Suitable sources include, but are not limited to, carbon arcs, mercury-vapor arcs, fluroescent lamps with special ultraviolet light-emitting phosphors, argon glow lamps, photographic flood lamps, radioactive cobalt sources, and so forth.

The time of irradiation must be sufficient to give the effective dosage, and irradiation may be carried out at any convenient temperature; most suitably it is carried out at room temperature for practical reasons. Distances of the radiation source from the work may range from about 1/8 inch to 10, and preferably about 1/8 inch to 6 inches.

Inks and coating compositions containing the modified epoxy resins of this invention may, if desired, be post-cured thermally, the conditions varying with the requirements of the end product; for example the thermal post-cure may range from about 2 minutes at 400° F. to 10 minutes at 320° F.

Compositions containing the modified epoxy resins of the present invention are suitable for use in the absence of solvents and in the presence of oxygen as vehicles for paints, lacquers, and printing inks which are capable of setting or hardening by exposure to radiation. They are suitable also as compositions and elements for the preparation of photographic images and printing plates; as adhesives for foils, films, paper, wood, foils, textures, glass, cardboard, box board, and the like; and so forth. Stock which may be printed includes paper, clay-coated paper, and various types of box board.

Photopolymerizable compositions including the modified resins of the present invention are well adapted for metal decorating inks and coatings. Glass and plastics may also be printed or coated, and the coatings are conventionally applied by roller or spray. Pigmented coating systems may be used for various polyester and vinyl films, glass; polymer-coated cellophane; treated and untreated polyethylene, for example in the form of disposable cups or bottles; treated and untreated polypropylene; and the like. Examples of metals which may be printed or coated include sized and unsized tin plate, tin-free steel, black iron, copper, brass, and aluminum.

The compositions described herein possess many advantages over the conventional oleoresinous and solvent-type inks and coatings. The substrate need not be pretreated or prepared in any way. The use of volatile solvents and the attendant hazards and air pollution problems are eliminated. The inks and coatings have excellent adhesion to the substrate after exposure to radiation. They have good gloss and rub-resistance and withstand temperatures as high as about 150° C. and as low as about −20° C. The printed or coated sheets can be worked and further processed immediately after exposure to the energy source. These modified resins aid in pigment wetting and dispersion and impart good flow to pigment dispersions. They improve the wet lithographic properties of inks, impart adhesion of the coating or ink to metal substrates after UV-curing and baking, and give good toughness to the ink or coating after exposure to radiation.

The invention and its advantages will be better understood with reference to the following illustrative examples, but it is not intended to be limited thereto. In the examples, the parts are given by weight unless otherwise specified. The atmospheric and temperature conditions were ambient unless otherwise noted.

EXAMPLE I (A) 500 Parts (1.05 equivalents) of Epon 1001 (Shell Chemical Company's Bisphenol A epichlorohydrin resin having an epoxy equivalent of 450–550 and a melting point of 64°–67° C.) and 370 parts (1.0 equivalent) of Resin 721 (Crosby Chemicals, Inc.'s resin produced by the fractional distillation of stabilized tall oil rosin having an acid number of 160 and a softening point of 77° C.) (determined by the Hg-drop method) were charged to a three-necked round bottom flask equipped with a stirrer, reflux condenser, and thermometer and heated to 140° C. until the mixture was fluid. Stirring was started, and the mixture was heated to 180° C. at which time 0.4 part of N,N-dimethylbenzylamine was added. The temperature was held at 175°–185° C. until the acid number was below 12 (about 30 minutes). The mixture was then cooled to 150° C., discharged into trays, cooled to 30° C., and crushed.

The product was an amber brittle solid that softened at 98° C.

(B) A white ink was prepared from the following ingredients:

| | % |
|---|---|
| Product of part (A) | 13 |
| Isocyanate-modified pentaerythritol triacrylate (as disclosed in U.S. Pat. No. 3,759,809) | 38 |
| Benzophenone | 2 |
| Methyl diethanolamine | 1 |
| Thioxanthone | 1 |
| Titanium dioxide | 45 |

The ink was applied to a sheet of tin-free steel at normal film weight. The printed substrate was exposed to consecutive 0.1-second flashes of ultraviolet light and cured to a tack-free film in 0.2 second.

(C) A blue ink was prepared from the following ingredients:

| | % |
|---|---|
| Product of part (A) | 14.5 |
| Isocyanate-modified pentaerythritol triacrylate | 59.0 |
| Benzophenone | 4.5 |
| Thioxanthone | 1.0 |
| Methyl diethanolamine | 2.0 |
| Microcrystalline wax | 2.0 |
| Phthalocyanine blue | 17 |

The ink was applied to a sheet of aluminum at normal film weight. The printed substrate was exposed to consecutive 0.1-second flashes of ultraviolet light and cured to a tack-free film in 0.4 second.

EXAMPLE II

The procedure of Example I was repeated with each of the following rosins instead of Resin 721 and the softening points of the products are tabulated below:

| Rosin | Softening Point, ° C |
|---|---|
| Hydrogenated wood rosin | 92 |
| Dehydrogenated wood rosin | 92 |
| Polymerized wood rosin | 102 |

EXAMPLE III

The procedure of Example I was repeated with Staybelite Resin (Hercules' hydrogenated wood rosin) and each one of the following epoxy resins; the softening points of the products are tabulated below:

| Rosin | Softening Point, ° C. |
|---|---|
| Epon 828 (Shell's Bisphenol A epichlorohydrin resin having an epoxy equivalent of 185–192) | 71 |
| Epon DRH-201 (Shell's Bisphenol A epichlorohydrin resin having an epoxy equivalent of 740) | 107 |
| Epi-Rez 510 (Celanese Resins Company's Bisphenol A epichlorohydrin resin having an epoxy equivalent of 185–200) | 73 |
| Epi-Rez 520C (Celanese Resins Company's Bisphenol A epichlorohydrin resin having an epoxy equivalent of 450–525 and a melting range of 65–75°C.) | 94 |
| Araldite 6004 (Ciba-Geigy's Bisphenol A epichlorohydrin resin having an epoxy equivalent of 177–181) | 72 |

What is claimed is:

1. A rosin-modified epoxy resin prepared by heating at a temperature of about 140°–220° C. (a) an epoxy resin having the formula

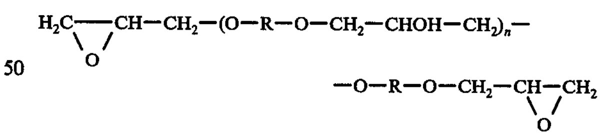

wherein R is the divalent hydrocarbon radical of the dihydric phenol and $n$ is an integer of at least 1 and (b) tall oil rosin, hydrogenated wood rosin, dehydrogenated wood rosin, polymerized wood rosin, or gum rosin, the equivalent ratio of rosin acid to epoxy resin being about 0.85–1:1.

2. The rosin-modified epoxy resin of claim 1 wherein the reaction temperature is about 150°–185° C.

3. The rosin-modified epoxy resin of claim 1 wherein the epoxy resin is a Bisphenol A epichlorohydrin resin.

* * * * *